United States Patent
Muramatsu et al.

(10) Patent No.: US 6,693,640 B2
(45) Date of Patent: *Feb. 17, 2004

(54) IMAGE PROCESSING APPARATUS AND IMAGE PROCESSING SYSTEM USING THE APPARATUS

(75) Inventors: Shoji Muramatsu, Hitachi (JP); Yoshiki Kobayashi, Hitachi (JP); Kenji Hirose, Hitachi (JP); Shigetoshi Sakimura, Hitachi (JP)

(73) Assignees: Hitachi, Ltd., Tokyo (JP); Hitachi Engineering Co., Ltd., Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/114,937

(22) Filed: Apr. 4, 2002

(65) Prior Publication Data

US 2002/0118203 A1 Aug. 29, 2002

Related U.S. Application Data

(63) Continuation of application No. 09/260,129, filed on Mar. 1, 1999, now Pat. No. 6,384,832.

(30) Foreign Application Priority Data

Mar. 5, 1998 (JP) .............................................. 10-53083

(51) Int. Cl.$^7$ ............................................... G06F 15/67
(52) U.S. Cl. ........................ 345/541; 345/505; 345/536
(58) Field of Search .............................. 345/502, 505, 345/520, 541, 535, 501, 503, 531, 536

(56) References Cited

U.S. PATENT DOCUMENTS

| 5,467,459 A | 11/1995 | Alexander et al. |
| 5,561,784 A | 10/1996 | Chen et al. |
| 5,579,444 A | 11/1996 | Dalziel et al. |
| 5,809,278 A | * 9/1998 | Watanabe et al. ........... 345/532 |
| 5,847,718 A | 12/1998 | Watson |
| 5,959,689 A | 9/1999 | Lange et al. |
| 6,006,303 A | * 12/1999 | Barnaby et al. ............. 710/240 |
| 6,025,923 A | 2/2000 | Kageyama et al. |
| 6,070,003 A | 5/2000 | Gove et al. |
| 6,223,274 B1 | 4/2001 | Catthoor et al. |

FOREIGN PATENT DOCUMENTS

| JP | 61151775 | 7/1986 |
| JP | 5120239 | 5/1993 |
| JP | 5307531 | 11/1993 |
| JP | 070933274 | 4/1995 |
| JP | 08123970 | 5/1996 |

* cited by examiner

Primary Examiner—Ulka J. Chauhan
(74) Attorney, Agent, or Firm—Antonelli, Terry, Stout & Kraus, LLP

(57) ABSTRACT

An image processing apparatus is composed of a plurality of function processing units for performing image processing, a high priority function selection part for selecting functions, execution of each of which is required by a corresponding one of the function processing units, based on the predetermined priority for each of the functions; and a data control unit including a data transfer part for preferentially accessing the shared memory which the function selected by the high priority function selection part requires, and a plurality of data holding parts, each of the data holding parts holding a predetermined amount of data transmitted with each of the plurality of function processing units, wherein the data transfer part controls the bus connecting the CPU and the shared memory based on requirement sent from each of the function processing units, and each of the plurality of function processing units transmits data with the data control unit separately from the others of the plurality of function processing units, and executes its function in parallel to the others of the plurality of function processing units.

7 Claims, 11 Drawing Sheets

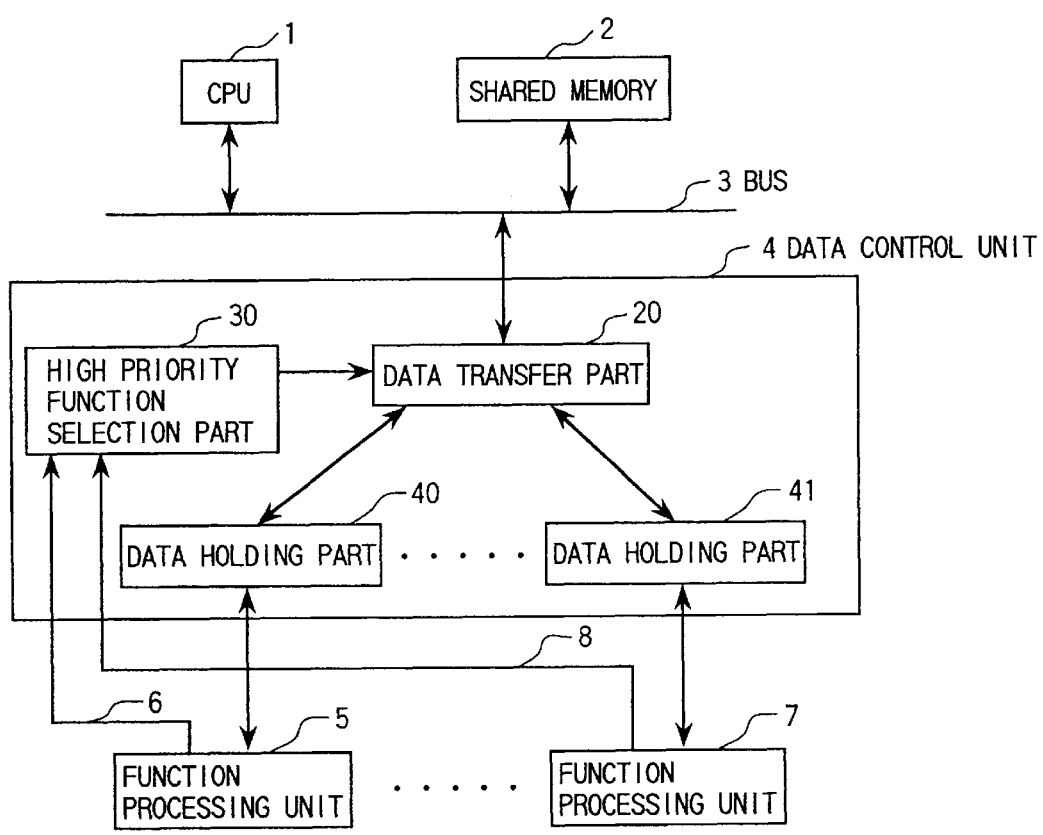

CONVENTIONAL EXAMPLE 1

CONVENTIONAL EXAMPLE 2

MATRIX OF PIXEL DATA IN AN IMAGE

ADDRESS ALLOTMENT OF PIXEL DATA

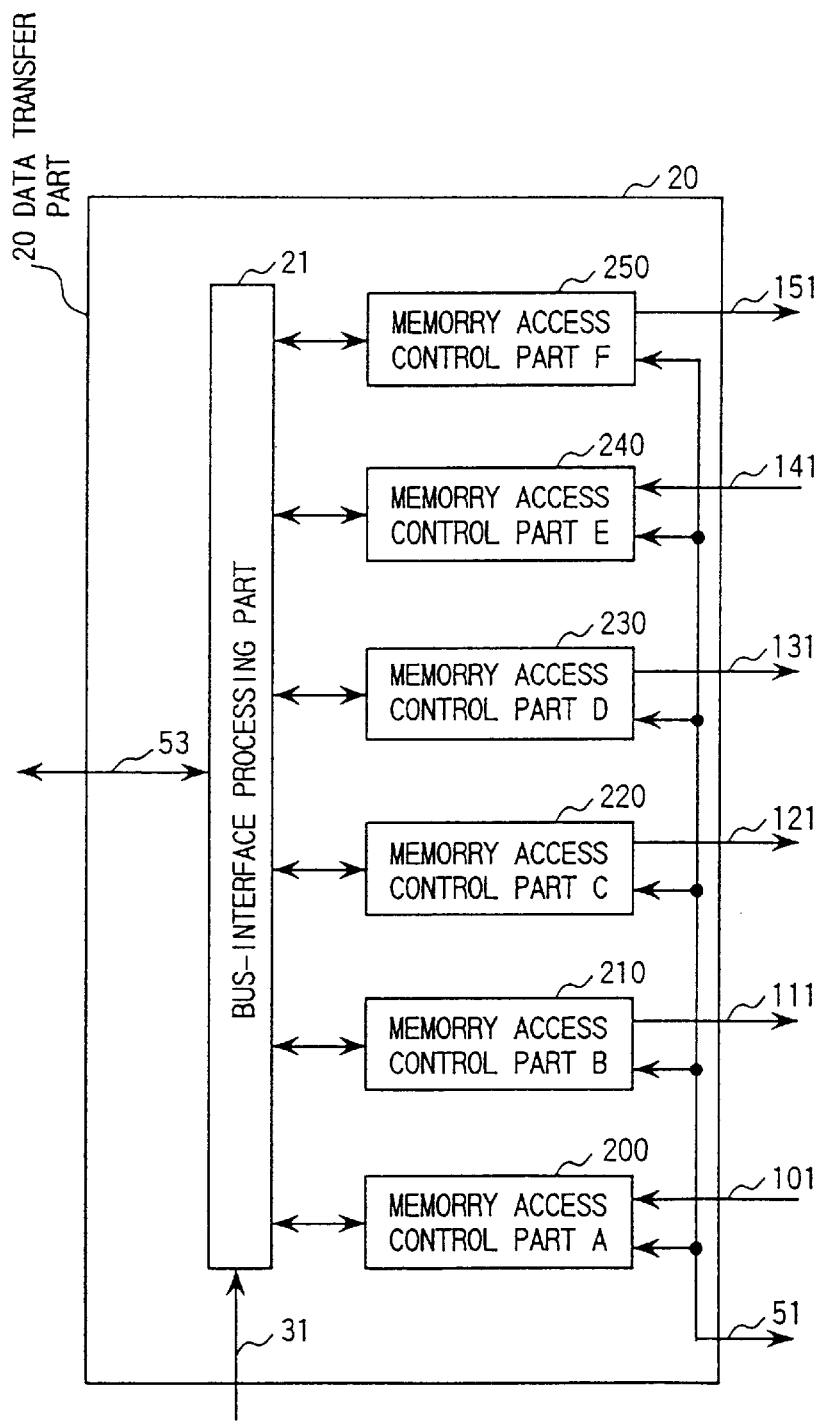

NO DATA-CONTRACTION

DATA-CONTRACTION WITH RATIO OF 1/2

DATA-CONTRACTION WITH RATIO OF 1/8

IMAGE PROCESSING APPARATUS AND IMAGE PROCESSING SYSTEM USING THE APPARATUS

This is a continuation of parent application Ser. No. 09/260,129, filed Mar. 1, 1999, allowed now U.S. Pat. No. 6,384,832.

BACKGROUND OF THE INVENTION

The present invention relates to an image processing apparatus which is capable of processing a plurality of functions; and, especially, the invention relates to an image processing apparatus and an image processing system using the apparatus in which a plurality of functions are efficiently executed by using a shared memory as both a main memory for a CPU an dan image memory.

As a first example of a conventional image processing technique for processing an image at a high speed, for example, as disclosed in Japanese Patent Application Laid-Open Hei 5-307531, the composition of an image processing apparatus with a plurality of image memories exclusively used for an image processing unit is shown in FIG. 2A. In this image processing apparatus, the feeding of data to be processed from one of the image memories to the image processing unit can be performed in a parallel to the storing of the processed data in the image memory, which can improve the speed of image data processing. Also, even if the image processing unit is replaced by an image input/output unit, it is possible to access the image memory in parallel while simultaneously performing an image input task and an image output task. That is, reading image data out of the image memory can be performed in parallel to writing image data into the image memory.

Moreover, as a second example of a conventional image processing technique for processing an image at a high speed, for example, as disclosed in Japanese Patent Application Laid-Open Hei 5-120239, the composition of an image processing apparatus with a shared memory provided for a CPU as a main memory and for an image processing unit as an image memory is shown in FIG. 2B. In this image processing apparatus, since the shared memory is used by the CPU, the image processing unit, and the image input/output unit, it is possible to reduce the amount of hardware, which makes it possible to downsize the image processing system. If both the image processing unit and the image input/output unit include a part capable of controlling a bus, the scope of operations performed by the image processing unit and the image input/output unit can be easily expanded by connecting the part to the bus.

However, in the first conventional example shown in FIG. 2A, since the image processing apparatus includes a plurality of image memories in order to process an image at a high speed, there is a large amount of hardware. Moreover, since it is necessary to indirectly access data in the image memory via the image processing unit when the CPU accesses data in the image memory, an increased overhead is required to perform such access. This overhead makes it difficult to realize a high-speed access to the image memory from the CPU. On the other hand, in the second conventional example shown in FIG. 2B, since the CPU, the image processing unit, and the image input/output unit all use the one shared memory, there is a problem in that the load on the bus 2 becomes heavy. For example, if calculational processing of image data and input/output processing of picture data are executed in parallel, since the access to the image data and the picture data in the shared memory is performed via the bus 2, the load on the bus 2 is heavier than that in an image processing apparatus having an image memory which is exclusively used for image processing. That is, in the composition of the second conventional example, since arbitration for use of the bus 2 is necessary, the overhead required for such arbitration makes it difficult to increase the processing speed of the image processing apparatus when both the image processing unit and the image input/output unit frequently use the bus 2.

Furthermore, since the second conventional example shown in FIG. 2B does not possess a plurality of buses for the image processing unit and the image input/output unit to exclusively perform their respective accesses, various sets of image data cannot be processed in parallel. For example, feeding image data out of the shared memory to the image processing unit cannot be performed in parallel with sending the processed image data from the image processing unit to the shared memory. Accordingly, the processing speed is decreased in the second conventional example.

SUMMARY OF THE INVENTION

The present invention has been achieved in consideration of the above-described problems, and has the object of providing an image processing apparatus in which a plurality of image processing functions are processed in parallel by realizing a method of efficient memory access, whereby the image processing can consequently be executed at a high speed.

To attain the above object, the present invention provides an image processing apparatus in which the main memory of a CPU is used as a shared memory, which also functions as an image memory, and image processing is performed by a plurality of function processing units, the image processing apparatus comprising:

a high priority function selection part for selecting functions, with the execution of each being required by a corresponding one of the function processing units, based on a predetermined priority for each of the functions; and a data control unit including a data transfer part for preferentially accessing the shared memory, as required by the function selected by the high priority function selection part, and a plurality of data holding parts provided between the shared memory and the plurality of function processing units, with each of the plurality of data holding parts holding a predetermined amount of data which is processed by a corresponding one of the plurality of function processing units;

wherein each of the plurality of function processing units communicates with the data control unit separately from the others of the plurality of function processing units, and executes its function in parallel to the functions executed by the others of the plurality of function processing units.

Moreover, in the above-described image processing apparatus, the data control unit is connected to the CPU and the shared memory via a bus, and the data transfer part controls the bus connecting the CPU and the shared memory based on a requirement for data transfer requested by each of the function processing units.

Furthermore, in the above-described image processing apparatus, each of the data holding parts includes a bit-width change function for changing both the bit-width of data transferred on the bus connecting the CPU and the shared memory and the bit-width of data processed by the function processing units, and transmits data with the bus in synchronization with the same operation clock as the clocks used for the bus, and transmits data with the function processing units in synchronization with the same operation clock as the clocks used for the function processing units.

Additionally, in the above-described image processing apparatus, the data control unit simultaneously accesses image data of a plurality of pixels, stored in the shared memory, the number of the plurality of the image data corresponding to the bit-width of data stored in the shared memory.

Also, in the above-described image processing apparatus, the data transfer part reads multiple types of image data out of the shared memory in turn and sends the multiple types of image data to the plurality of data holding parts, and each of the plurality of data holding parts stores the image data sent to the data holding part and transmits image data with one of the function processing units independent of the others of the function processing units, the one function processing unit being connected to the data holding part and executing image processing in parallel with the other function processing units.

Further, in the above-described image processing apparatus, the sending of resultant data obtained by processing in each of the function processing units to a corresponding one of the data holding parts is performed in parallel with the inputting of the stored image data to the function processing unit from the one of the data holding parts.

Further still, in the above-described image processing apparatus, the data control unit and the plurality of function processing units are integrated in an integrated circuit formed in one silicon chip.

On the top of that, the present invention provides an image processing system in which a main memory of a CPU is used as a shared memory that is also used as an image memory, the image processing system comprising:

an image processor including a plurality of function processing units for performing image processing, a high priority function selection part for selecting unctions, the execution of each of which is required by a corresponding one of the function processing units, based on a predetermined priority for each of the functions; and a data control unit including a data transfer part for preferentially accessing the shared memory which the function selected by the high priority function selection part requires, and a plurality of data holding parts provided between the shared memory and the plurality of function processing units, each of the plurality of data holding parts holding a predetermined amount of data which is processed by a corresponding one of the plurality of function processing units, in which each of the plurality of function processing units communicates with the data control unit separately from the others of the plurality of function processing units, and executes its function in parallel to the others of the plurality of function processing units;

an image input unit connected to the image processor, to input data of an image;

wherein the shared memory stores image data input from the image input unit;

an image output unit connected to the image processor, to output data of an image obtained by processing in the image processor; and buses for connecting the image processor, the CPU, and the shared memory.

In accordance with the present invention, it is possible to reduce the load on a bus connecting a main memory of a CPU and a plurality of function processing units used for image processing, by providing a plurality of data holding parts provided between the shared memory and the plurality of function processing units. Furthermore, since each of the plurality of data holding parts holds a predetermined amount of data which is to be processed by a corresponding one of the plurality of function processing units, each of the plurality of function processing units can execute its function in parallel to functions executed by the other function processing units.

BRIEF DESCRIPTION OF THE DRAWINGS

FIG. 1 is a schematic block diagram showing the concept of an image processing apparatus representing an embodiment according to the present invention.

FIG. 8 is a block diagram showing operations of memory access to control parts in the data transfer part of the embodiment.

DETAILED DESCRIPTION OF THE EMBODIMENTS

Figure 2A:
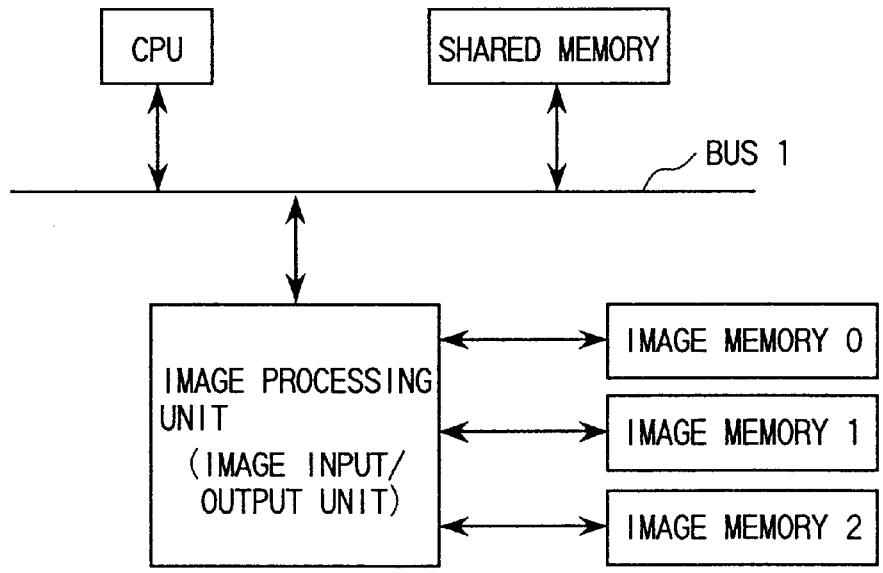
FIGS. 2A and 2B are block diagrams showing examples of conventional image processing apparatuses.
Figure 2B:
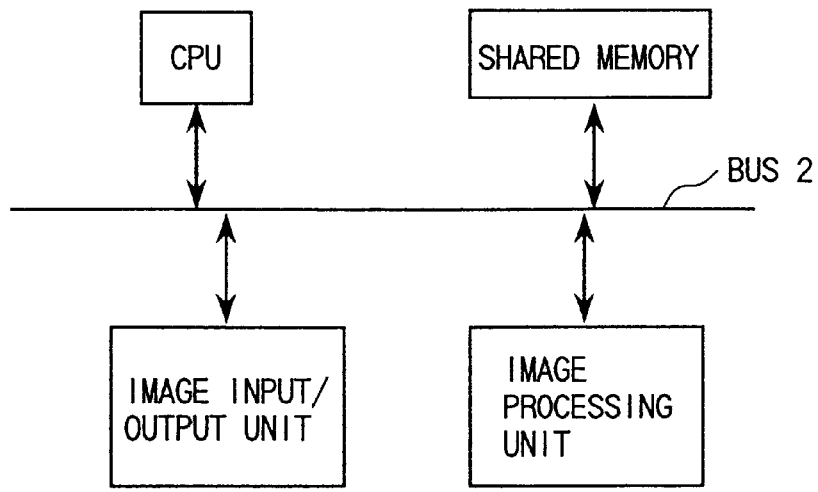

Hereafter, details of the embodiments will be explained with reference to the drawings.

FIG. 1 is a schematic block diagram showing the concept of an image processing apparatus representing an embodiment according to the present invention. By using FIG. 1, the principle of the image processing performed in ths embodiment will be outlined below.

The CPU 1 controls the whole of the image processing apparatus. Control programs executed by the CPU 1 and data used for the control programs are stored in a shared memory 2. The data used for the control programs, such as image data to be processed, parameters for filtering of image data, and so on are stored in the shared memory 2. The CPU 1 controls the image processing apparatus while accessing the shared memory 2 and reading out necessary data or writing in resultant data. Image processing functions such as an arithmetic operation, image pick-up and display functions, etc., are performed by a function processing unit 5, a function processing unit 7, and so on, respectively and separately. When the function processing units 5 and 7 are to execute their functions, the units 5 and 7 send respective execution demand signals to a high priority function selection part 30 separately via signal lines 6 and 8, indicating that they require access to necessary image data in the shared memory 2. The high priority function selection part 30, which has received the execution demand signals sent from the function processing units 5 and 7, determines the execution order of the functions (the execution of which is demanded by each of the processing units 5 and 7) based on a predetermined priority order of the functions. Moreover, the high priority function selection part 30 sends a signal for executing the function having the highest priority to the data transfer part 20. The data transfer part 20 accesses the shared memory 2 so that the function selected by the high priority function selection part 20 can be processed, and then reads a set of image data out of the shared memory 2, which data is used by the selected one of the function processing units 5 and 7. The sets of image data obtained by memory access are held in data holding parts 40 and 41, respectively, and are further sent to the function processing units 5 and 7. Here, the data control unit 4 includes the data transfer part 20, the high priority function selection part 30, and the data holding parts 40 and 41.

According to the above-mentioned principle of the embodiment of the present invention, each of the date holding parts 40 and 41 stores the data to be processed by a corresponding one of the function processing units 5 and 7. Therefore, if each of the processing units 5 and 7 processes data within the amount of data stored in each data holding part, the function processing units 5 and 7 can execute their functions in parallel. Thus, efficient data storage becomes possible by using the data holding parts 40 and 41, which can improve the processing speed of the image processing apparatus.

Figure 3:
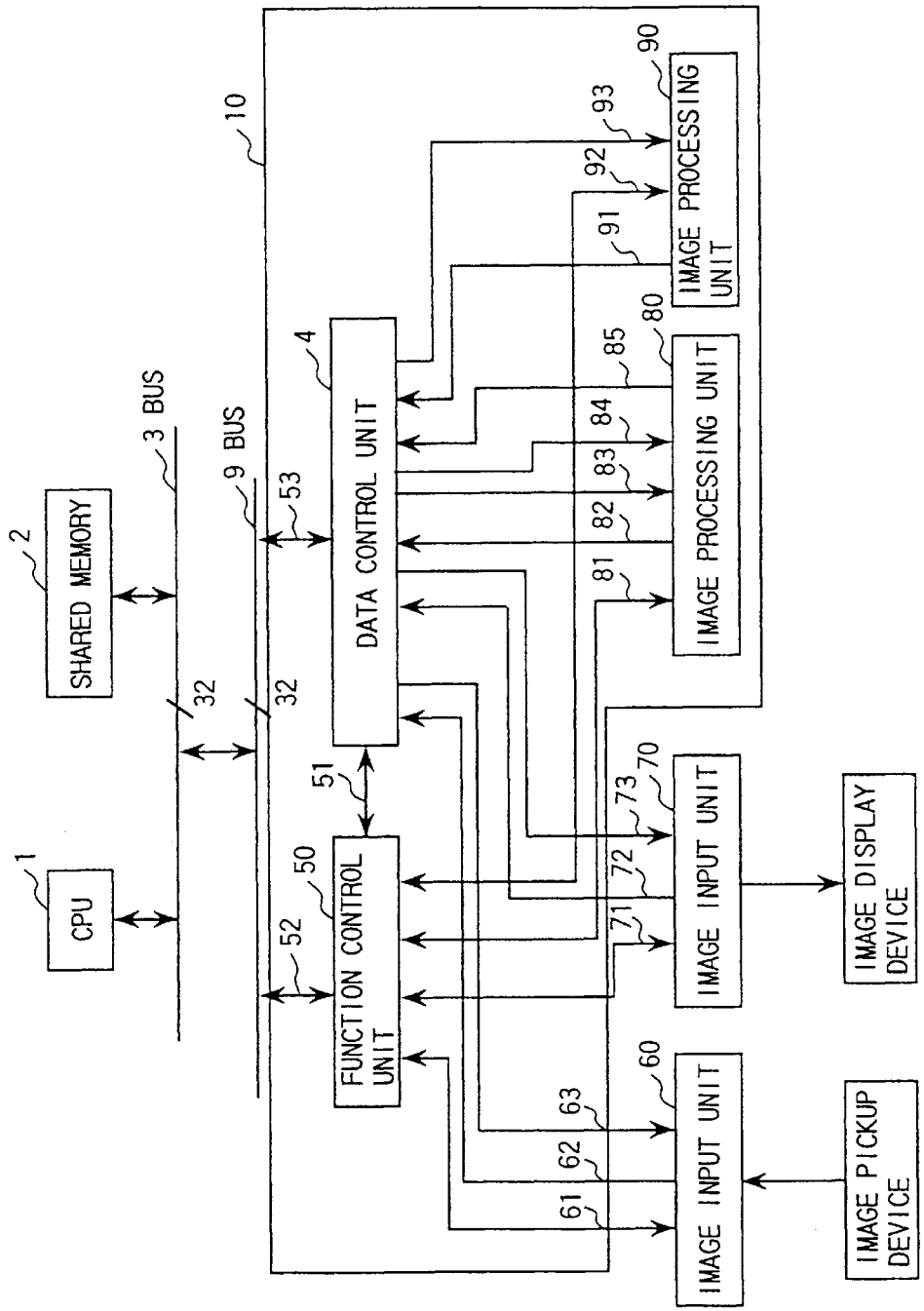
FIG. 3 is a block diagram showing more detailed composition of the image processing apparatus of FIG. 1.

FIG. 3 shows a more detailed composition of the image processing apparatus shown in FIG. 1.

In the following, the embodiment shown in FIG. 3 will be explained in detail.

The image processing apparatus shown in FIG. 3 includes an image input unit 60 for controlling an input operation for image data picked-up by an image pickup device, an image output unit 70 for controlling an output operation which outputs image data to an image display device, such as a monitor, and image processing units 80 and 90, each capable of carrying out a plurality of image processing functions. Image data to be processed is input to the image input unit 60 from an image pickup device, such as a camera. Image processing operations such as a pixel conversion operation, an arithmetic operation, an edge enhancement operation, a feature extraction operation, a template matching operation, and so on, are executed in the image processing units 80 and 90 by using image data stored in the shared memory 2. Each function of the image processing units 80 and 90 is controlled by the CPU 1 via a function control unit 50. Here, the arbitration of the bus 3 is not carried out by the image input unit 60, the image output unit 70, or the image processing units 80 and 90, but only by the CPU 1 and the data control unit 4. Accordingly, in this embodiment according to the present invention, since the load imposed by arbitration of the bus 3 is reduced, it is possible to improve the processing speed of the image processing apparatus. In addition, since the image processing units and the image input and output units are connected in parallel to the data control unit 4, which controls the bus 3, the image processing operations controlled by the data control unit 4 can be executed in parallel. Furthermore, although the processor 10 is composed of the function control unit 50, the data control unit 4, and the image processing units 80 and 90 in this embodiment as shown in FIG. 3, it is also possible that the processor 10 to include the image input and output units 60 and 70.

A method of storing the pixel data (that is, image date) in the shared memory 2 provided in the image processing apparatus will be explained in detail below with reference to FIGS. 4A and 4B.

In this embodiment of the present invention, the bit-width of an image data signal is eight bits. Therefore, in the following explanation, the bit-width (depth) of image data input from the image input unit 60 and image data fed to the image processing units 80 and 90 is assumed to be eight bits.

Figure 4A:
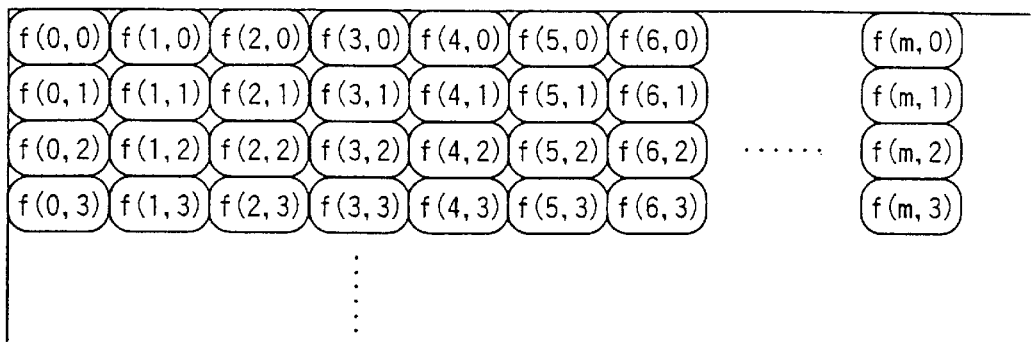
FIGS. 4A and 4B are diagrams for explaining the pixel data storage method in a shared memory provided in the image processing apparatus of the embodiment.

First, a matrix of a logical data arrangement for pixel data—that is, image data—used for the image processing, is shown in FIG. 4A. In this figure, f(x, y) indicates the value of an individual pixel at the coordinates (x, y). Now, in the following, it will be explained how the image data shown in FIG. 4A is stored in the shared memory 2. In this embodiment, the bit-width of data stored in the shared memory 2 is 32 bits. Therefore, image data of four pixels are stored together at one address in the shared memory 2. Accordingly, in this embodiment, it is possible to access image data of four pixels within one cycle of a clock for the bus 3. Consequently, the data transfer speed of the bus 3 becomes four times that of the data processing speed of image processing in which image data of only one pixel is processed in one cycle of the clock by the function processing units. Thus, in this embodiment, by making use of this feature, image data can be efficiently transferred from the shared memory 2 to the data holding parts 40 and 41. Moreover, the priority of each function is preset to the high priority function selection part 30 as follows.

That is, the priority of the image input processing function>that of the image output processing function>that of the image processing function.

Although this priority order is changeable as a matter of course, each function should be given its priority in advance.

In the following, the image processing operations performed in this embodiment will be explained in detail with reference to FIG. 3–FIG. 6.

Figure 4B:
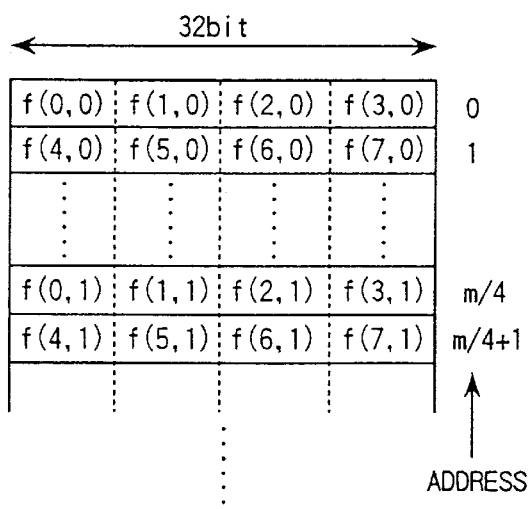

Here, a method of executing an arithmetic operation for adding two images A and B of image data allotted to respective addresses in the shared memory 2 as shown in FIG. 4B will be explained. Also, this arithmetic operation is performed by the image processing unit 80.

An outline of the operations executed by the image processing unit 80 when the arithmetic operation is performed will be described.

To begin with, the CPU 1 sends an instruction signal and parameters necessary for the execution of the specified arithmetic operation to the image processing unit 80 via the function control unit 50. Meanwhile, arithmetic operations for addition and subtraction executed by the image processing unit 80 are switched according to parameters set in a register provided in the image processing unit 80. After sending the parameters, when two sets of image data a and b of images A and B are fed via signal lines 83 and 84, respectively, the image processing unit 80 executes the arithmetic operation for adding the images A and B, and outputs the resultant image data r obtained by the arithmetic operation to a signal line 85. In the transferring of the sets of the image data a and b, a validity signal for the transferred image data a and b is also sent to the image processing unit 80 together with the image data a and b. The image processing unit 80 processes only image data which the validity signal indicates to be valid. According to this embodiment, since the image data a and b are fed in parallel, and the image processing unit 80 also outputs the resultant image data r in parallel to the feeding of the data a and b, the image processing can be efficiently executed. The above-explained operations are shown in the timing chart in FIG. 5. Details of this timing chart will be explained later.

Furthermore, the feeding of the two sets of the image data a and b will be explained in detail below.

The CPU 1 sets the parameters necessary to feed the image data a and b and store the resultant image data r obtained by the arithmetic operation to the data transfer part 20 in the data control unit 4 (FIG. 6) via a signal line 51. That is, the set parameters are parameters to designate addresses in the shared memory 2 at which the image data a and b are stored, the amount of the image data to be processed by the arithmetic operation, and parameters to designate addresses of the shared memory 2 at which the resultant image data r is to be stored. After the setting of the above parameters for access to the shared memory 2, the CPU 1 sets the status of the image processing unit 80, such that the unit 80 starts execution of the arithmetic operation for adding the images A and B. The setting of the status is carried out by setting the statue of bits in a status register of the image processing unit 80. The image processing unit 80 sends a data demand signal requiring the transmission of image data used for executing the specified arithmetic operation to the high priority function selection part 30 in the data control unit 4 shown in FIG. 6 via a signal line 82. The high priority function selection part 30 turns on a bit of a function-demand register (not shown in FIG. 6) in the high priority function selection part 30, corresponding to the demand signal sent from the image processing unit 80, and controls access to the shared memory 2 so that the access to data required by each of the functions for which bits of the function-demand register are turned on is performed in the priority order of these functions. Here, it is also possible to adopt an other priority processing method in the high priority function selection part 30, in which, when the high priority function selection part 30 receives a demand signal requiring data sent from one of the image processing units, the part 30 checks for the presence of demand signals from other image processing units, and if demand signals from other image processing units exist, a comparison among priority values of functions executed in the other image processing units sending the demand signals is carried out by the part 30, and memory access is performed based on the result of the comparison. For example, if demand signals requiring data are sent from image processing units other than the image processing unit 80, there is a check to examine whether or not priority values of functions executed by the other image processing units are higher than that of the function executed by the image processing unit 80. Further, if the priority of the image processing unit 80 is higher than that of each of the other image processing units, or there is only a demand signal from the image processing unit 80, the high priority function selection pert 30 permits the data transfer part 20 to access the shared memory 2 to acquire the data required by the image processing unit 80 via the signal line 31. Afterward, the image data a in the shared memory 2 is accessed, and the read-out image data a is temporarily stored in the data holding part C120. Also, the image date bin the shared memory 2 is accessed, and the read-out image data a is temporarily stored in the data holding part D 130. After the transfer of the image data a and b from the shared memory 2 to the respective data holding parts C 120 and D 130 has been completed, the image data a and b are fed to the image processing unit 80 from the data holding parts C 120 and D 130, respectively. Furthermore, the resultant data r obtained by the operations in the image processing unit 80 is output when a predetermined number of cycles has passed after the completion of the data feeding operations for the image data a and b, and the resultant data r is stored in the data holding part E 140. Finally, the resultant data r is transferred to and stored in the shared memory 2.

Figure 5:
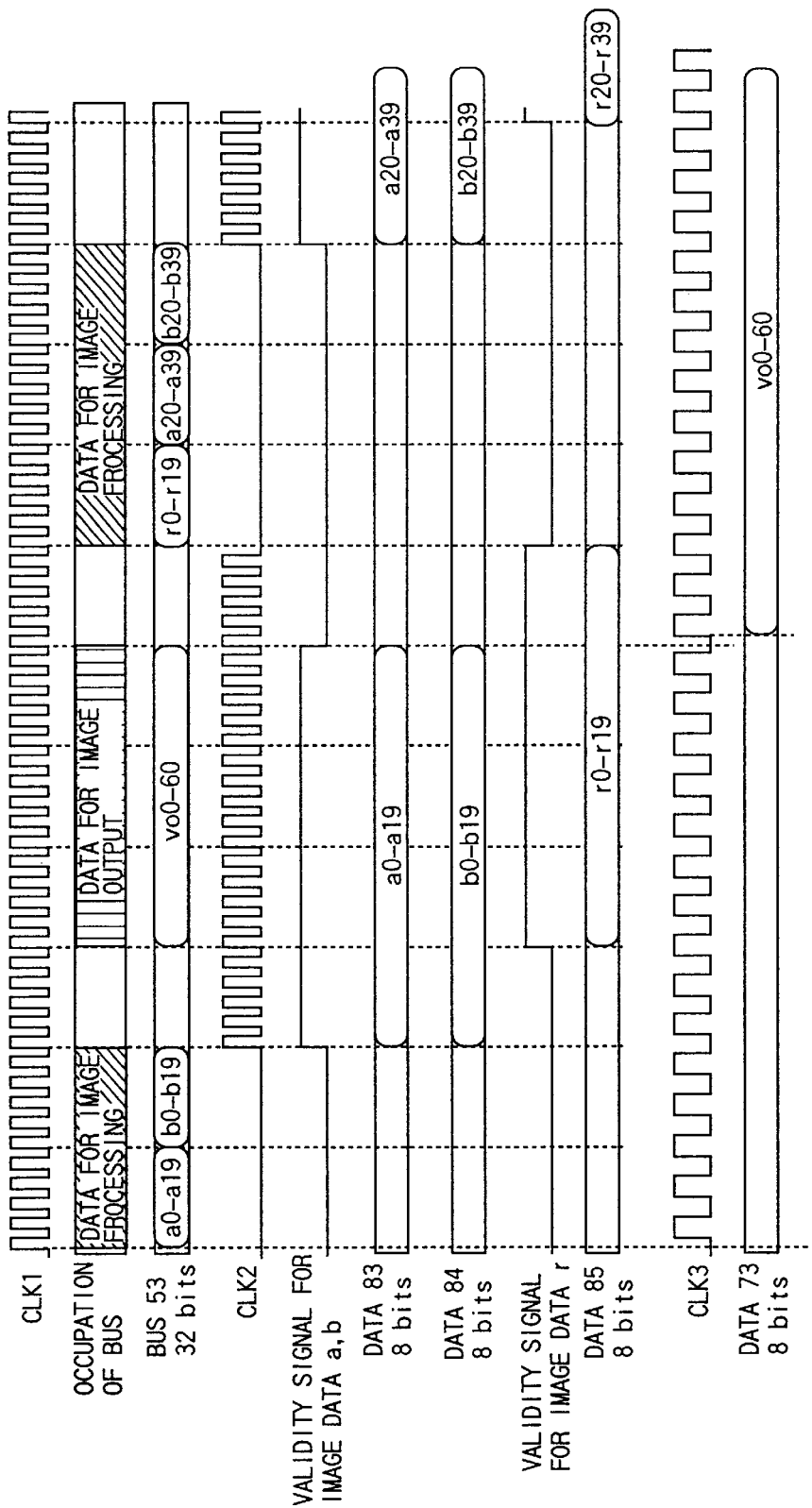
FIG. 5 is a timing chart showing operations of the image processing apparatus of the embodiment.
Figure 6:
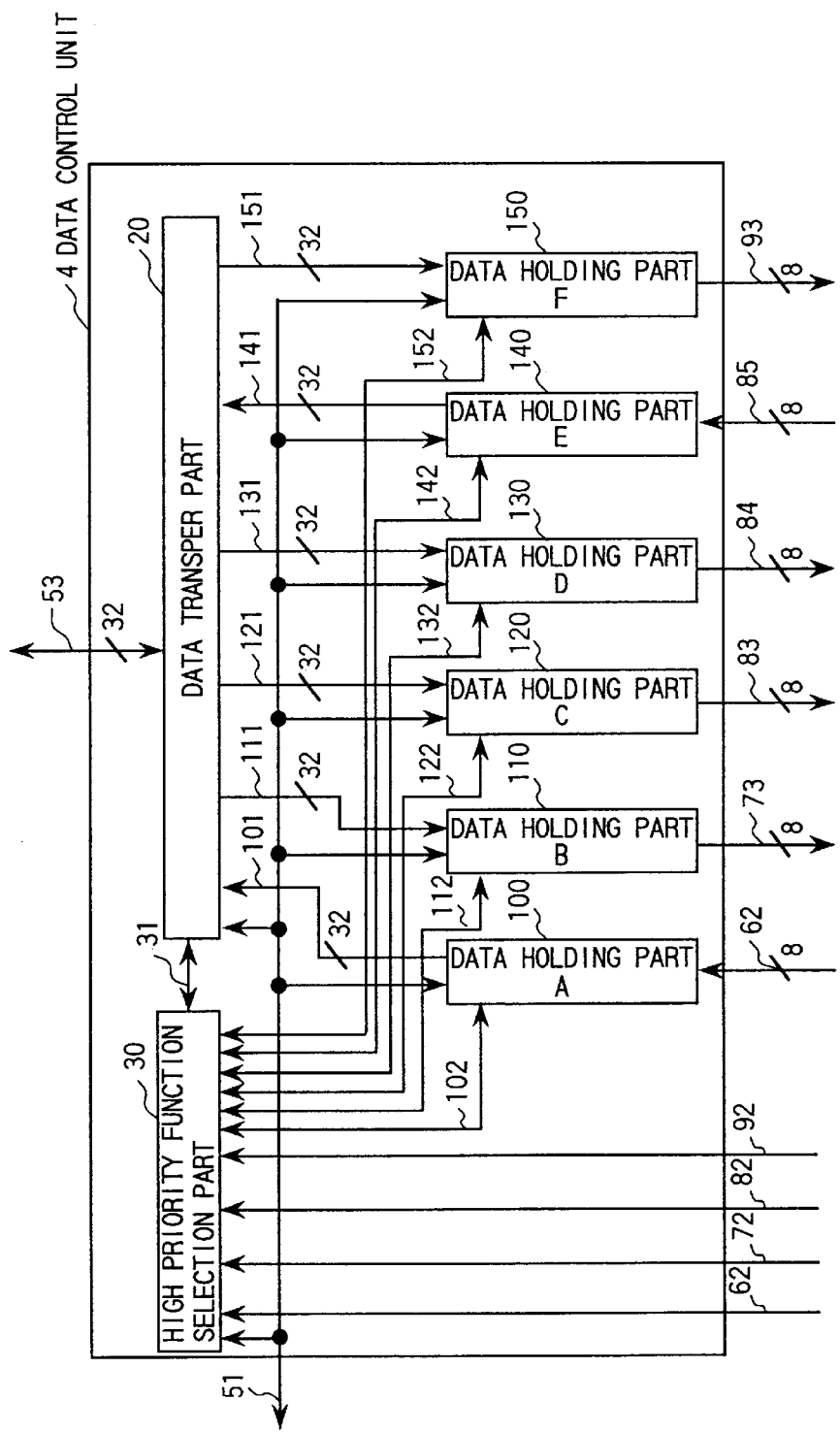
FIG. 6 is a block diagram showing the composition of a data control unit of the embodiment.
Figure 7:
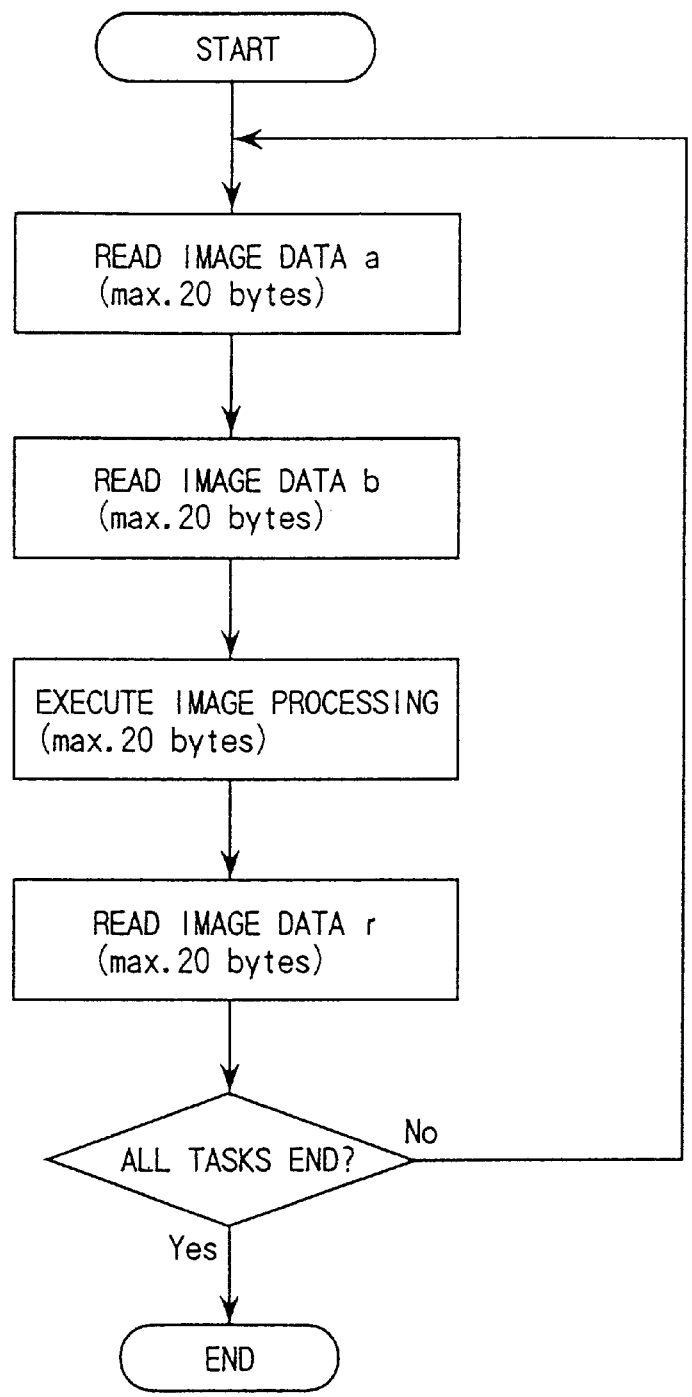
FIG. 7 is a flow chart showing operations of a data transfer function of the embodiment.

The above-explained operations are shown in the timing chart in FIG. 5. As shown in FIG. 5, the image data a0–a39 and the image data b0–b39 are divided into two sets, and the two sets are transferred by two separate transfer operations. The reason why the image data a and b are transferred by two separate transfer operations is that it is assumed that the capacity of the data hold pats C 120 and D 130 is 20 bytes each. The operations shown in the timing chart in FIG. 5 are controlled by the data transfer part 20 according to the flow chart shown in FIG. 7. In this embodiment, the image data is transferred to the data holding parts C 120 and D 130 via the bus 3 by making use of the full transfer ability of the bus 3. Therefore, the transfer of the image data a and b occupies a period (the shortest period which is determined by the amount of the transferred image data and the transfer ability of the bus 3) which is shorter than the time necessary for the image processing unit 80 to process the image data end b. Accordingly, since it becomes possible for other image processing units, such as the image input/output units, to use the bus 3 while the bus 3 is open, the processing speed of the image processing apparatus can be increased. Although the bus 3 is occupied for a period while accessing image data required by one of the image processing units, the bus 3 is also left open to the image processing units for a preset period. Therefore, if the access and the transfer of the image data required by an image processing unit have been completed, and the preset period has not expired yet, another image processing unit can acquire access to necessary image data in the shared memory 2 without new arbitration to obtain the occupation right for use of the bus 3. The arbitration of the occupation right for use of the bus 3 is carried out by a bus arbitration part (not shown in this figure) in the data control unit 4.

In FIG. 5, the timing control for the image output processing is also shown. As shown in FIG. 5, the period of the operation clock CLK3 used for the image input/output processing is set et a longer cycle then that of the operation clock CLK1 used for data access and data transfer via the bus 3, and that of the operation clock CLK2 used for processing in the image processing units. This is because the frequency of the operation clock for the image input and output devices is as low as 12.5 MHz or 25 MHz. However, in this embodiment, since image data used for the image outputting operation is transferred to the data holding part B 110 by using the full transfer ability of the bus 3, it is possible to minimize the occupation period of the bus 3.

In the above embodiment, the capacity for the data holding parts C 120, D 130, and E 140 is a comparatively small number of bytes. It is because these data holding parts possess only enough capacity to absorb the difference between the data transfer ability of the bus 3 and the data processing ability of the processing unit 80. In this embodiment, the data transfer ability of the bus 3 is higher than the data processing ability of the processing unit 80, and it is not necessary to provide large capacity data holding parts to make the most of the full transfer ability of the bus 3.

As a mater of course, although the capacity of the data holding parts C 120, D 130, and E 140 is 20 bytes each, it is possible to increase the capacity to more than 20 bytes.

Also, although the data holding parts C 120, D 130, and E 140 are provided in the data control unit 4, it is possible to provide these data holding parts in the image input unit 60, the image output unit 70, the image processing unit 80 or the image processing unit 90.

Meanwhile, in the above embodiment, the operation clock signals CLK2 are not sent to the image processing unit 80 for intervals other than the period in which valid data is transferred or the validity signal is sent. This control of CLK2 is carried out to reduce the consumption of power in the image processing apparatus.

In the following, details of the data transfer part 20 will be explained with reference to FIG. 8. Three sets of parameters (address region, the number of image data to be processed, and so on) necessary for processing the image 5 data a and b and the resultant data r are set to the memory access control parts C 220, D 230 and E 240, respectively. The setting of these parameters to the memory access control parts C 220, D 230, and E 240 is performed by the CPU 1 via a signal line 53. The information on data required by the function selected by the high priority function selection part 30, that is, a signal including the set of parameters for the function whose requirement for access to image data necessary for its processing is allowed, is sent to a bus-interface processing part 21, and the part 21 executes the allowed memory access.

For example, when the access to the image data a is carried out, operations of the bus-interface processing part 21 are performed as follows.

To begin with, the bus-interface processing part 21 obtains the occupation right for use of the bus 3, and informs the memory access control part C 220 that the usage right for the bus 3 has been obtained. And further, the memory access control part C 220 generates a signal (at least including the addresses of the required image data a and the amount of the image date a) necessary for access to the shared memory, and reads the image data a out of the shared memory 2. The image data a read out of the memory 2 is stored in the data holding part C 120 via a signal line 121.

According to this embodiment, the function processing units do not need to obtain the occupation right for use of the bus 3 while the bus-interface processing unit 21 maintains the occupation right for the bus 3. For example, after the image data a has been acquired, the image data b can be acquired without arbitration of the bus 3. Moreover, in another example, even if an interruption is required for image input during the arithmetic operation, the bus-interface processing part 21 does not obtain the occupation right for use of the bus 3 (the arbitration of the bus 3). As mentioned above, it becomes possible to efficiently use the bus 3 and improve the processing speed of the image processing apparatus by reducing the frequency of arbitration for use of the bus 3. This embodiment is especially effective if the capacity of the respective data holding parts A 100–F 150 is small, or if interruptions are frequently required for high priority processing functions.

In this embodiment, the bit-width for data stored in the shared memory 2, data transferred on the bus 3, and data stored in the data holding parts A 100–F 150 is 32 bits. On the other hand, the bit-width for data input to or output from the image input unit 60, the image output unit 70, and the image processing units 80 and 90 is 8 bits. Control of the data-width for processed data will be explained belong with reference to FIGS. 9A–9C and FIG. 10.

Figure 9A:
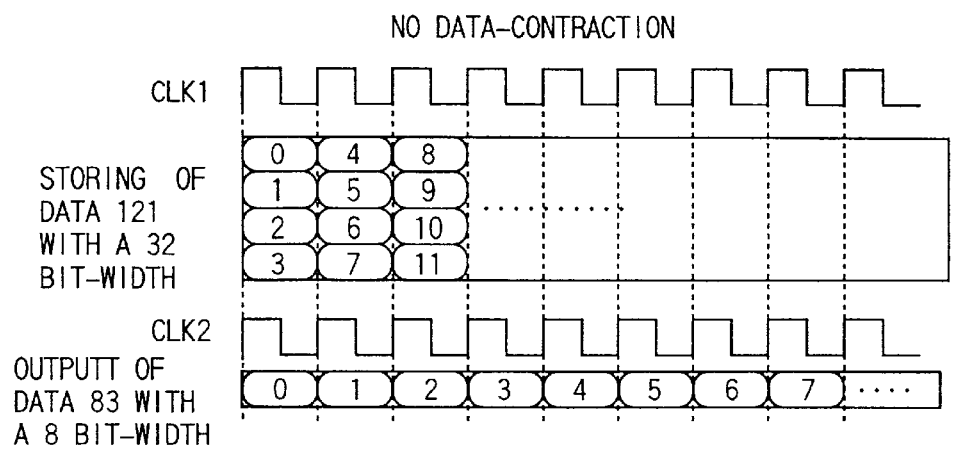
FIGS. 9A, 9B, and 9C are diagrams showing examples of the data bit-width changing method used in the embodiment.

The transfer of data from the shared memory 2 to the data holding parts A100–F150 is carried out with a bit-width of 32 bits to take best advantage of the transfer ability of the bus 3. With regard to FIGS. 9A–9C, the data transfer for the data holding part C 120 will be explained below. In the first example, as shown in FIG. 9A, the data transferred via a signal line 121 is stored in the data holding part C 120 with a bit-width of 32 bits. The operation clock used for the bus 3 and data transfer is CLK1. On the other hand, if data is input to the image processing unit 80 via a signal line 83, data with a bit-width of 8 bits, which the image processing unit 80 can process, is serially input to the unit 80 by using the operation clock CLK2, which is also used for the unit 80. Here, pixel data is expressed in 8 bits.

Figure 9B:
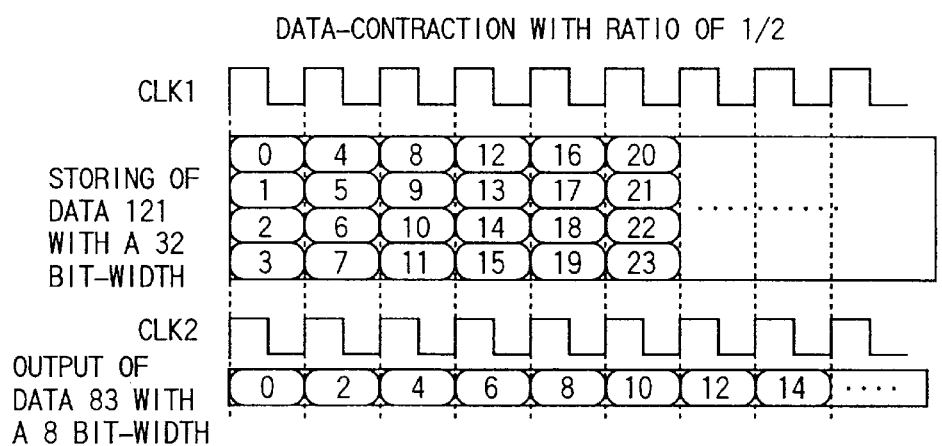
Figure 9C:
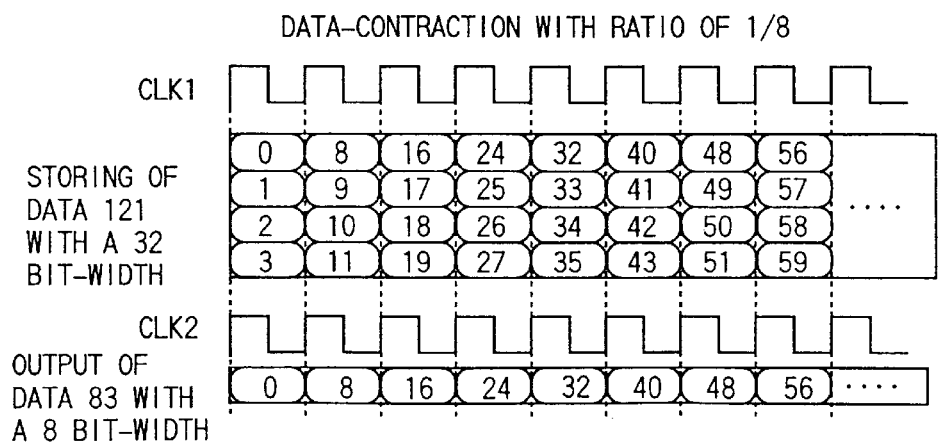

In the above-explained control of the bit-width, which is shown in FIG. 9A, all of the date read-out of the shared memory 2 is used for image processing. However, in some cases, it is not necessary to use all of the data stored in each data holding part. For example, as shown in FIG. 9B, if the image processing is executed using data-contraction with a ratio of ½' only a half of the data stored in one of the data holding parts is input to the image processing unit 80. Also, as shown in FIG. 9C, if the image processing is executed using data-contraction with a ratio of ⅛, the amount of data which is accessed in the shared memory 2 is reduced by one half, and the same control of the bit-width as that shown in FIG. 9B is performed. The control of the above access to the shared memory 2 can be realized by adding a circuit for controlling access to the shared memory 2 to the memory access control part C 220. As mentioned above, any ratio of data contraction can be attained by controlling both the amount of data which is accessed in the shared memory 2 and the data transferred from the corresponding data holding parts.

Next, the input of data sent from the image input unit 60, the image processing unit 80, and so on to the data holding part A 100, the date hording pert E 140, and so on will be explained below with reference to FIG. 10.

Figure 10:
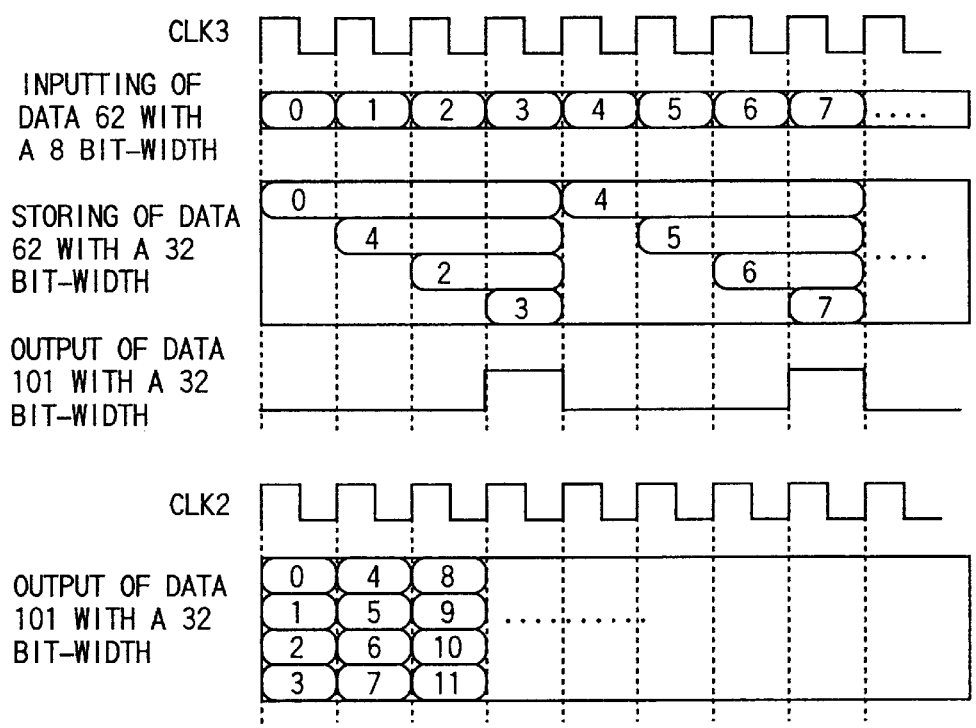
FIG. 10 is a diagram showing another example of the data bit-width changing method used in the embodiment.

The image data is input in synchronization with the same operation clock CLK3 as the clock used for the image input unit 60, and the holding of the image data is performed at the time when the signal for storing data shown in FIG. 10 is turned on. Further, the image data is transferred to the shared memory 2 in synchronization with the same operation clock CLK1 as the clock used for the bus 3.

Figure 11:
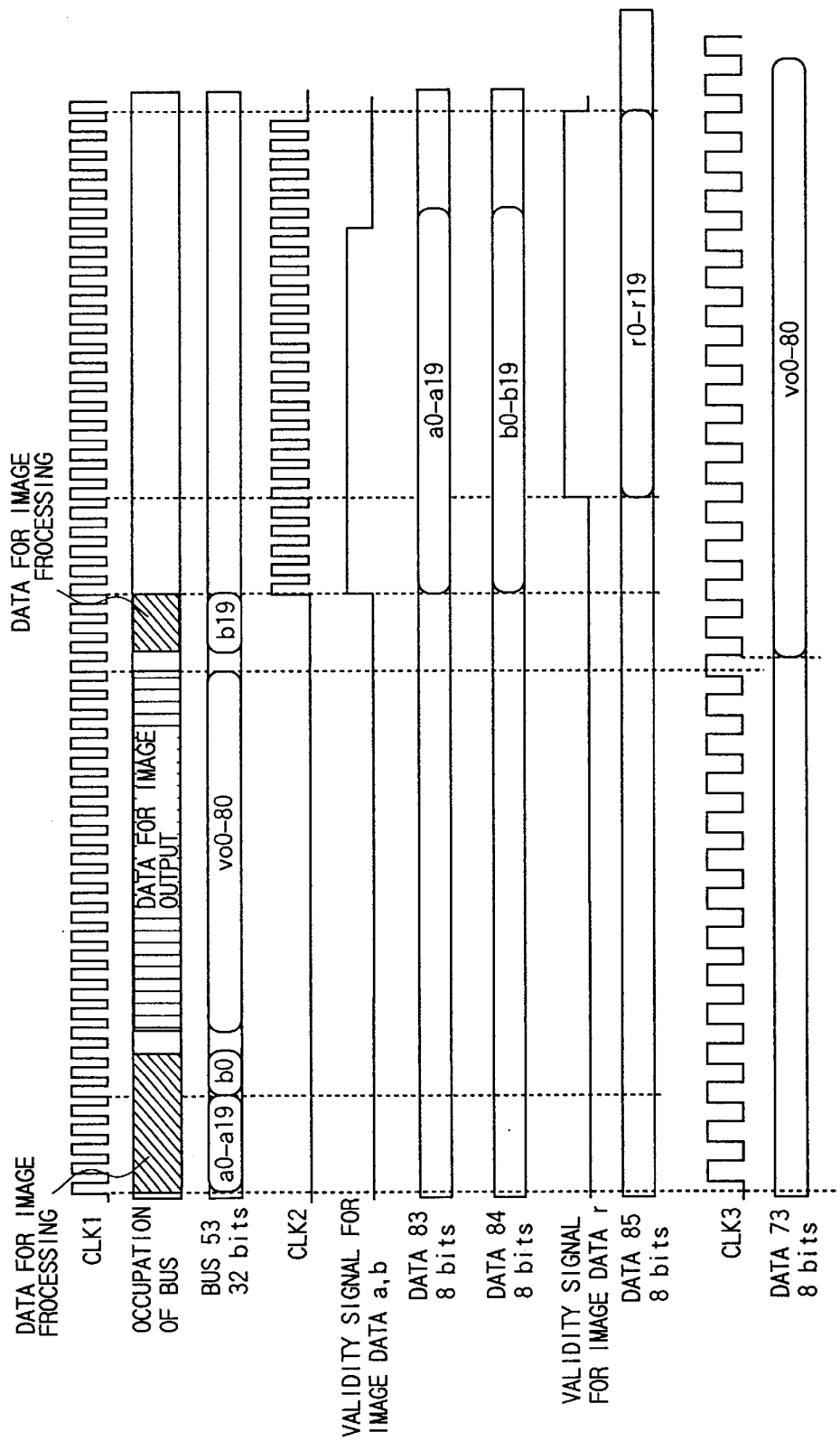
FIG. 11 is a timing chart for explaining the priority processing performed in the embodiment.

Operations of the high priority function selection part 30, in which the performance of another process is required during the period in which image processing is being performed, will be explained below. In these operations, as shown in FIG. 11, an interruption to perform a function with a higher priority executed in the image output unit 70 is required 5 during the performance of a function executed in the image processing unit 80. If the performance of a function with a higher priority than the priority of the function performed in the image processing part 80 is required, the access to the shared memory 3 for the function performed in the image processing unit 80 is immediately interrupted. And further, the execution state of the image processing unit 80 at the time when the performance of the function is interrupted is stored in the memory access control part C 210, and after the access to the shared memory 2 for the higher priority function which required the interruption is completed, the access to the memory 2 for the interrupted function in the image processing unit 20 is restarted.

According the embodiments of the present invention, it is possible to transfer data by making the most of the transfer ability of the bus 3 in any operational state when the image processing units use the bus 3. Furthermore, since each function for image processing can be performed without receiving the effects of the other functions, and independent of the state of the bus 3 if the date necessary for the function exists in a corresponding data holding part, it is possible to improve the processing speed of the image processing apparatus.

In the above-described embodiments according to the present invention, a function performed in a function processing unit can be implemented by one or more physical means, or a plurality of functions performed in one or more function processing units can be implemented by one physical means.

Moreover, according to the present invention, it becomes possible to execute image processing functions performed in an image processing apparatus in parallel by providing a data holding part for each image processing function.

Furthermore, according to the present invention, even if the processing speed of the image processing is lower then the speed of the data transfer on a bus connecting a CPU and its main memory, it is possible to efficiently use the bus by making the most of the transfer ability of the bus, which improves the processing speed of the image processing apparatus.

Thus, in accordance with the present invention, by providing data holding parts between a group of image processing units executing image processing functions and a shared memory used as both a main memory of a CPU and an image data memory, it becomes possible to reduce the load on a bus connecting the CPU and the shared memory.

What is claimed is:

1. A processing apparatus for use with a shared memory, the shared memory being usable as a main memory of a CPU and as an image memory, which comprises a plurality of function processing units for processing information and a data control unit, the data control unit comprising:

a priority function selection part for selecting request functions, execution of each of which is required by each of the plurality of function processing units, on the basis of predetermined priorities for the request functions;

a data transfer part for preferentially accessing the shared memory on the basis of the predetermined priorities for the request functions in order to process the selected request function by the priority function selection part; and a plurality of data holding parts, provided between the shared memory and the plurality of function processing units, for each holding a predetermined amount of data processing the selected request function required by each function processing unit, a certain one of the plurality of function processing units executing its request function in parallel with the others of the plurality of function processing units;

wherein the data control unit and the shared memory are connected to a common CPU bus, all processing conducted in the processing apparatus being performed through the CPU bus.

2. The processing apparatus according to claim 1, wherein, if executing a function of a higher priority than that of a currently executed function, said high priority function selection part stops the access to said shared memory for said currently executed function of a lower priority, and controls so that said function of said higher priority accesses said shared memory.

3. The processing apparatus according to claim 1, wherein said high priority function selection part controls so that each function accesses said shared memory by a time-sharing method.

4. The processing apparatus according to claim 1, wherein said data transfer part accesses said shared memory only one time at each access period.

5. The processing apparatus according to claim 1, wherein said data transfer part is connected to a bus with said CPU and said shared memory.

6. The processing apparatus according to claim 1, wherein said data control unit is connected to said CPU and to said shared memory via a bus, and said data holding part implements bit-width-conversion of said bus and bit-conversion of said function processing units which perform image processing.

7. The processing apparatus according to claim 1, wherein said data control unit is connected to said CPU and to said shared memory via a bus, and said data holding part transfers data synchronizing with operation-clocking of said bus, and transfers data synchronizing with operation-clocking of function processing units.

* * * * *